(12) United States Patent
Chang et al.

(10) Patent No.: US 7,747,788 B2
(45) Date of Patent: Jun. 29, 2010

(54) HARDWARE ORIENTED TARGET-SIDE NATIVE COMMAND QUEUING TAG MANAGEMENT

(75) Inventors: Naichih Chang, Shrewsbury, MA (US); Victor Lau, Marloboro, MA (US); Pak-lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 11/172,627

(22) Filed: Jun. 30, 2005

(65) Prior Publication Data

US 2007/0011360 A1    Jan. 11, 2007

(51) Int. Cl.
*G06F 3/00* (2006.01)
*G06F 13/28* (2006.01)

(52) U.S. Cl. .......................... 710/5; 711/120
(58) Field of Classification Search ............. 710/5; 370/447

See application file for complete search history.

(56) References Cited

U.S. PATENT DOCUMENTS

| | | | |
|---|---|---|---|
| 5,555,402 | A | 9/1996 | Tuma et al. |
| 5,781,926 | A | 7/1998 | Gaskins et al. |
| 5,802,340 | A | 9/1998 | Mallick et al. |
| 5,862,406 | A | 1/1999 | Matsumoto et al. |
| 6,790,075 | B1 | 9/2004 | Sung |
| 6,843,674 | B1 | 1/2005 | Young |
| 6,917,992 | B2 | 7/2005 | Grimsrud et al. |
| 7,028,106 | B2 * | 4/2006 | Foster et al. ............ 710/2 |
| 7,093,033 | B2 | 8/2006 | Beckett et al. |
| 2003/0021239 | A1 | 1/2003 | Mullendore et al. |
| 2003/0236952 | A1 * | 12/2003 | Grieff et al. .......... 711/151 |
| 2004/0019718 | A1 * | 1/2004 | Schauer et al. .......... 710/105 |
| 2004/0073719 | A1 | 4/2004 | Grimsrud et al. |
| 2004/0100944 | A1 * | 5/2004 | Richmond et al. .......... 370/360 |
| 2004/0252716 | A1 * | 12/2004 | Nemazie .............. 370/447 |
| 2004/0268169 | A1 * | 12/2004 | Bashford et al. ............ 713/320 |
| 2005/0015532 | A1 | 1/2005 | Beckett et al. |
| 2005/0138191 | A1 | 6/2005 | Seto et al. |
| 2005/0138202 | A1 | 6/2005 | Seto |
| 2005/0149656 | A1 | 7/2005 | Seto |
| 2006/0004935 | A1 | 1/2006 | Seto et al. |
| 2006/0041691 | A1 | 2/2006 | Bashford et al. |

(Continued)

OTHER PUBLICATIONS

APT Technologies, Inc., et al., "Serial ATA: High Speed Serialized AT Attachment", *Revision 1.0a*, (Jan. 7, 2003),1-2, 184-236.

(Continued)

*Primary Examiner*—Henry W. H. Tsai
*Assistant Examiner*—Titus Wong
(74) *Attorney, Agent, or Firm*—Blakely, Sokoloff, Taylor & Zafman LLP

(57) ABSTRACT

Methods and apparatus for target-side SATA NCQ tag management are disclosed. In one aspect, an apparatus may include a status memory and a status manager circuit in communication with the status memory. The status memory may store status information for each of a plurality of commands that have been queued according to Native Command Queuing (NCQ). The status information may indicate whether or not each of the commands has been completed. The status manager circuit may generate and provide a status signal based on the status information stored in the status memory. Systems including such an apparatus and other components, such as hard disks, are also disclosed.

19 Claims, 5 Drawing Sheets

U.S. PATENT DOCUMENTS

| | | | |
|---|---|---|---|
| 2006/0041699 A1* | 2/2006 | Day et al. | 710/106 |
| 2006/0064568 A1 | 3/2006 | Seto et al. | |
| 2006/0294286 A1 | 12/2006 | Duerck et al. | |
| 2007/0002827 A1 | 1/2007 | Lau et al. | |
| 2007/0005838 A1 | 1/2007 | Chang et al. | |
| 2007/0005850 A1 | 1/2007 | Chang et al. | |
| 2007/0005896 A1 | 1/2007 | Chang et al. | |
| 2007/0006235 A1 | 1/2007 | Chang et al. | |
| 2007/0011333 A1 | 1/2007 | Lau et al. | |
| 2007/0011360 A1 | 1/2007 | Chang et al. | |
| 2007/0067504 A1 | 3/2007 | Lau et al. | |

OTHER PUBLICATIONS

Dell Computer Corporation, et al., "Serial ATA II: Extensions to Serial ATA 1.0a", *Revision 1.2*, (Aug. 27, 2004),24-52.

Dell Computer Corporation, et al., "Serial ATA II: Extensions to Serial ATA 1.0a", *Revision 1.2*, (Aug. 27, 2005),103-106.

Grimsrud, Knut , et al., "Serial ATA Storage Architecture and Applications (Designing High-Performance, Low-Cost I/O Solutions)", *Intel Press, ISBN 0-9717861-8-6*, (2003),Entire Book.

Intel Corporation, "Comparing Serial ATA Native Command Queing (NCQ) and ATA Tagged Command Queuing (TCQ)", *The Advantage of Serial ATA Native Command Queuing*, (Oct. 2003),1-4.

Sata-IO Board Members, et al., "Serial ATA International Organization: Port Multiplier", *Revision 1.2*, (Jan. 27, 2005),1-38.

"PCT/US2006/025750 Search Report", (Apr. 23, 2007),2 pages.

Dell Computer Corporation, et al., "Serial ATA II: Extensions to Serial ATA 1.0a", *Serial ATA Extensions Workgroup, XP-002414889*, (Aug. 27, 2004),pp. 22-32.

Intel Corporation, et al., "Serial ATA Native Command Queuing", *XP-002428259*, Joint Whitepaper by Intel Corporation & Seagate Technology,(Jul. 2003),the whole document (12 pages).

"PCT/US2006/025461 Search Report", 1 page.

"PCT/US2006/025462 Search Report", (Nov. 14, 2006),2 pages.

"PCT/US2006/025753 Search Report", 2 pages.

Dell Computer Corporation, et al., "Serial ATA II: Extensions to Serial ATA 1.0a", *Serial ATA Extensions Workgroup, XP-002414889*, (Aug. 27, 2004),pp. 22-32.

Intel Corporation, "Serial ATA II Native Command Queuing Overview, Application Note" www.intel.com/design/storage/papers/252664.htm, retrieved on Nov. 28, 2006,(Apr. 30, 2004),the whole document.

Intel Corporation, et al., "Serial ATA Native Command Queuing", *XP-002428259*, Joint Whitepaper by Intel Corporation & Seagate Technology,(Jul. 2003),the whole document (12 pages).

LSI Logic Corporation, "LSISAS1064 4-Port 3Gbit/s Serial Attached SCSI Controller" *Data Sheet, XP002404785 USA*, www.lsi.com/files/docs/techdocs/storage_stand_prod/sas/1064.ds.pdf, (Mar. 29, 2005),pp. 1-30.

LSI Logic Corporation, "LSISASx12 3.0 Gbits/s Serial Attached SCSI Expander", *Data Sheet, XP002404784 USA*, wwwlsilogic.com/files/docs/techdocs/storage_stand_prod/sas/sasx12_ds.pdf, (Feb. 3, 2005),pp. 1-26.

"U.S. Appl. No. 11/172,715 Office Action", (Nov. 13, 2007), 36 Pages.

"U.S. Appl. No. 11/172,715 Advisory Action (Jun. 23, 2008) 4 pgs."

"U.S. Appl. No. 11/172,715 Office Action (Apr. 3, 2008), 26 pgs."

"U.S. Appl. No. 11/172,715 Office Action Response, (Feb. 13, 2008), 15 pgs."

"U.S. Appl. No. 11/172,715 RCE&Preliminary Amendment (Jul. 2, 2008), 11 pgs."

"U.S. Appl. No. 11/172,715 RCE&Preliminary Amendment, (Jun. 3, 2008), 11 pgs."

\* cited by examiner

HARDWARE ORIENTED TARGET-SIDE NATIVE COMMAND QUEUING TAG MANAGEMENT

BACKGROUND

1. Field

Embodiments of the invention relate to the field of computer systems architecture. More specifically, embodiments of the invention relate to the field of command queuing.

2. Background Information

Native Command Queuing (NCQ) is an optional feature that is described, for example, in the document "Serial ATA II: Extensions to Serial ATA 1.0a", Revision 1.2, published Aug. 27, 2004, as well as related documents. In brief, NCQ may allow a target to accept multiple commands from an initiator device, and to optimize or otherwise re-order the execution of those commands.

The commands in NCQ may include an NCQ tag value that may identify the command. The NCQ tag values may be used in various ways on the target-side of the architecture. For example, the tag values may potentially be used to convey pending status of commands and/or completion status of commands.

Conventionally, the above-described target-side utilization of the NCQ tag is often implemented in application layer software or firmware that is executed by a target-side processor. One potential problem with such an implementation is that the software or firmware may tend to increase the load on the processor or otherwise limit performance.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
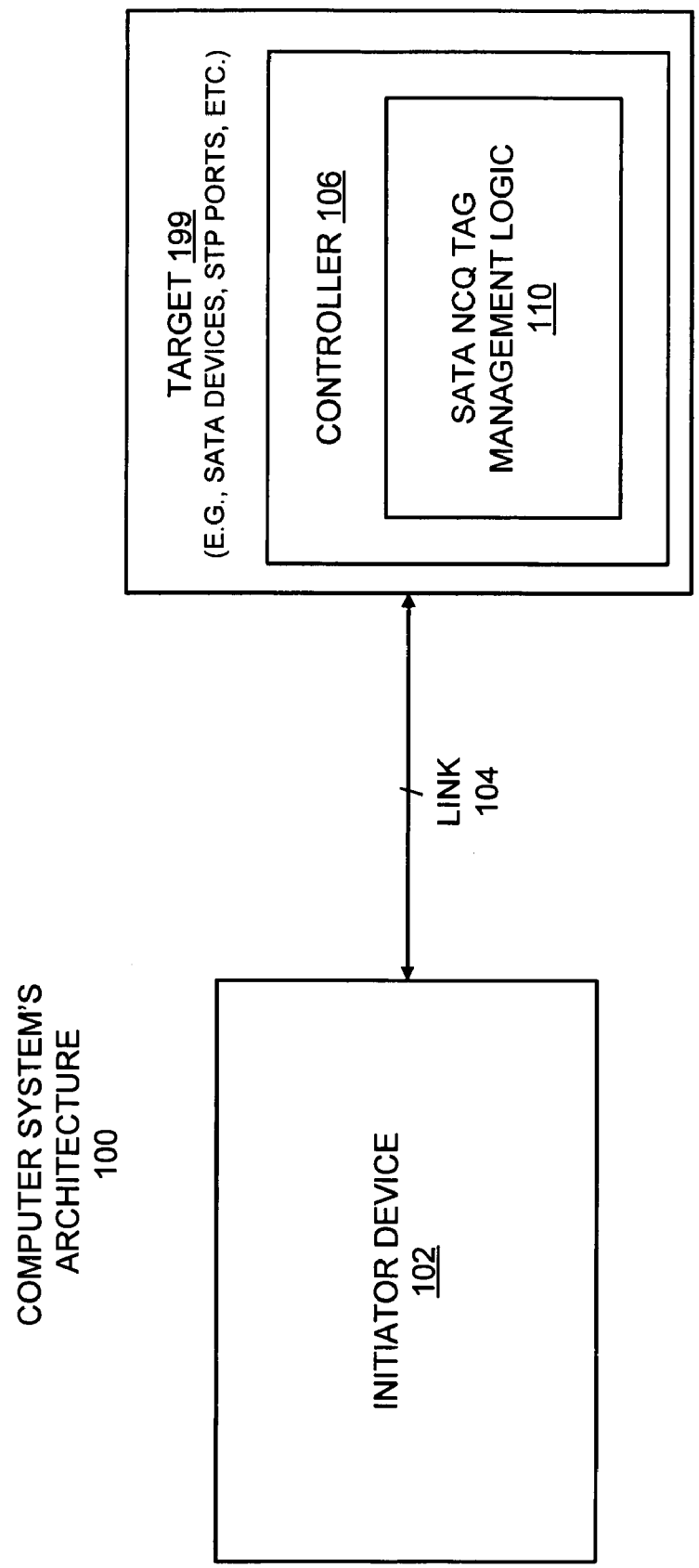
FIG. 1 is a block diagram showing a computer system's architecture including target-side SATA NCQ tag management logic, according to one or more embodiments of the invention.

FIG. 1 is a block diagram showing a computer system's architecture 100, according to one or more embodiments of the invention. The architecture includes an initiator device 102, a target 199, and a link 104. The initiator device may sometimes also be referred to herein as a host device.

Suitable initiator devices include, but are not limited to, Serial Advanced Technology Attachment (SATA) initiators and Serial Tunneling Protocol (STP) type Serial Attached SCSI (SAS) initiators. Background information on SATA is described, for example, in the document "Serial ATA: High Speed Serialized AT Attachment", Revision 1.0a, published on 7 Jan. 2003, in the document "Serial ATA II: Extensions to Serial ATA 1.0a", Revision 1.2, published Aug. 27, 2004, as well as related documents. Background information on SAS is described, for example, in the document "Serial Attached SCSI Specification 1.0", published November 2003, and Version 1.1, Revision 9d, released in May 2005, as well as related documents. Suitable SATA initiators and STP initiators include, but are not limited to, servers, desktop computers, laptop computers, and other computer systems known in the arts, as well as networks including such computer systems.

Suitable targets include, but are not limited to, SATA devices, STP ports, SAS/STP networks, SATA-to-other-protocol controllers, and external SATA controllers. STP devices, and networks having the STP ports, are also suitable. In one or more embodiments of the invention, the target may include a storage device, such as, for example, a hard disk drive, optical disk drive, or ATAPI (Advanced Technology Attachment Packet Interface) drive, to name just a few examples, although the scope of the invention is not limited in this respect. Suitable networks include, but are not limited to, storage networks, fiber channels, and the like.

The initiator device is coupled with, or otherwise in communication with, the target via the intervening link, such as, for example, via a SATA port or STP port. In particular, as shown, the initiator device and the target may each be connected to, or otherwise coupled with, the link.

The initiator device may issue commands to the target. The illustrated target includes a SATA Native Command Queuing (NCQ) tag management logic 110 that may be used to process the commands.

As shown in the illustrated embodiment, the SATA NCQ tag management logic may be hardware oriented and may be included in a controller 106 of the target, although the scope of the invention is not limited in this respect. The controller 106 may be integrated with the target, such as, for example, included within a primary housing or chassis of the target, although the scope of the invention is not limited in this respect.

NCQ is an optionally supported feature that is described in the aforementioned document "Serial ATA II: Extensions to Serial ATA 1.0a". NCQ may allow the target to accept multiple commands from the initiator device, and to re-order the execution of those commands. The commands may include read, write, or other data transfer commands, for example. The target may potentially optimize the order in which the commands are executed based on local information, such as, for example, in some cases, disk rotation position, and/or other target-side information. The target may then trigger out-of-order execution of the commands. Such re-ordering of commands may potentially offer improved performance for a highly queued workload, for example in a storage network, where multiple simultaneous commands may be outstanding. However, the scope of the invention is not limited to achieving this advantage.

In NCQ, the commands may include NCQ tags that may identify the commands. In one or more embodiments of the invention, the SATA NCQ tag management unit may manage the NCQ tags of the commands to perform functions such as, for example, conveying pending status of commands and/or conveying completion status of commands. The NCQ tag management unit may be hardware oriented, which may offer certain potential advantages over a software or firmware implementation. For example, implementing one or more of such tag management functions in hardware may tend to reduce the load on the target-side processor or otherwise increase performance.

Figure 2:
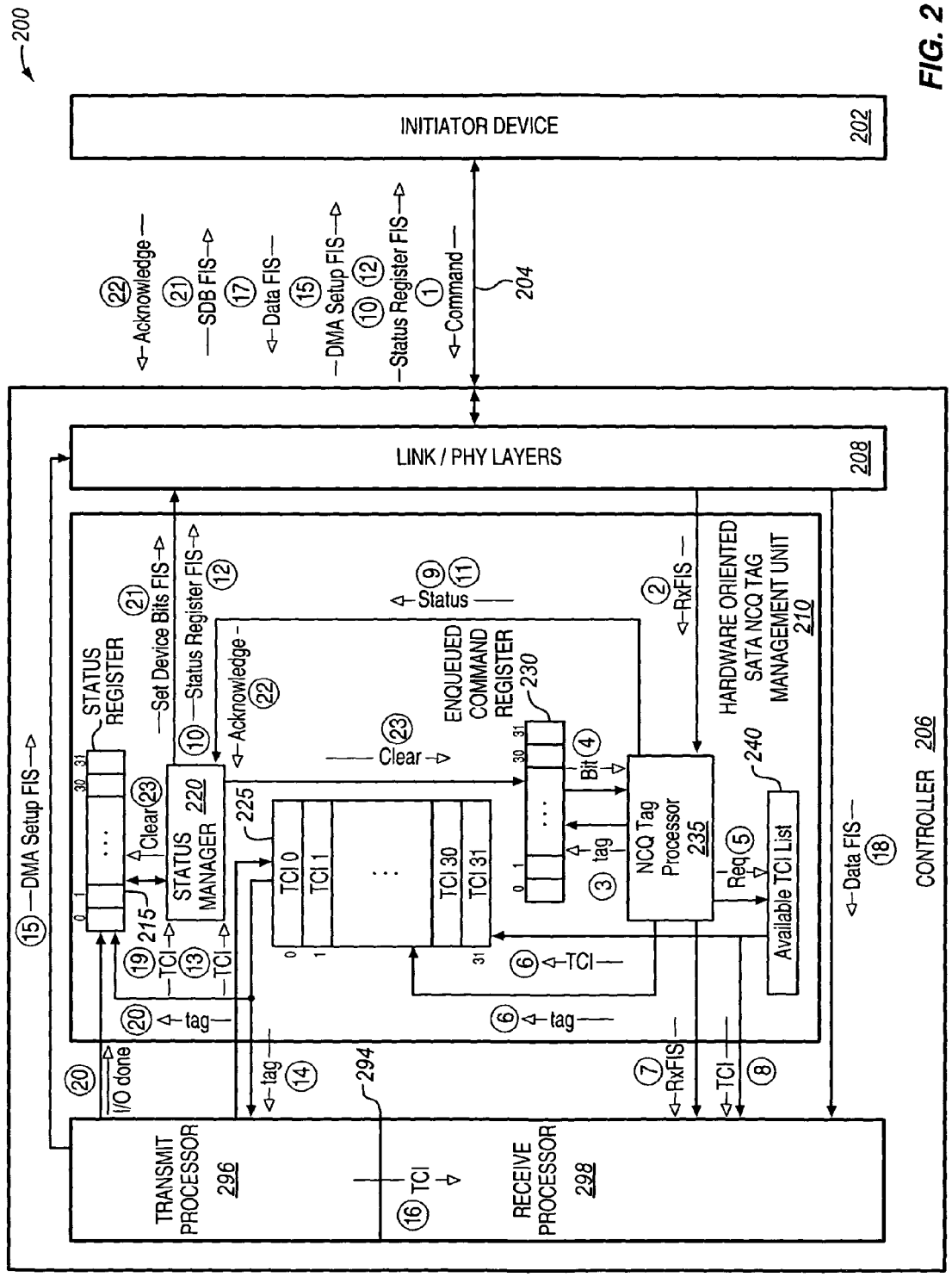
FIG. 2 is a block diagram showing a computer systems architecture including a detailed target-side hardware oriented SATA NCQ tag management unit, according to one or more embodiments of the invention.

FIG. 2 is a block diagram showing a computer system's architecture 200, according to one or more embodiments of the invention. The architecture includes an initiator device 202, a link 204, and a controller 206.

In one or more embodiments of the invention, the controller 206 may be included in, or may at least be in communication with, a target, such as, for example, a SATA device, an STP port, or the like. However, such controllers and hardware oriented SATA NCQ tag management units may also optionally be provided alone for potential incorporation in other devices.

The illustrated controller includes a SATA and/or STP (SATA/STP) serial digital link layer control logic and serial physical interface plant 208, a hardware oriented SATA NCQ tag management unit 210, and a SATA/STP transport layer protocol engine 294. The SATA/STP transport layer protocol engine includes a SATA/STP transport layer transmit processor 296 and a SATA/STP transport layer receive processor 298. As shown in the illustrated embodiment, the hardware oriented SATA NCQ tag management unit may be logically coupled between, or otherwise in communication between, the link and phy layers and the SATA/STP transport layer protocol engine.

For convenience, the SATA/STP serial digital link layer control logic and the serial physical interface plant may also be referred to herein simply as the link and phy layers. Likewise, for convenience, the SATA/STP transport layer transmit and receive processors may also be referred to herein simply as transmit and receive processors, respectively.

As shown, the hardware oriented SATA NCQ tag management unit may include a status register 215, a status manager 220, a task context index (TCI) mapping table 225, an enqueued command register 230, an NCQ tag processor 235, and an available TCI list 240. In one or more embodiments of the invention, the hardware oriented SATA NCQ tag management unit may be implemented at least partially, or largely, in hardware. Suitable hardware for implementing the registers includes, but is not limited to, flip-flops, dedicated SRAM (static random access memory), and other types of registers and memory known in the arts. Suitable hardware for implementing the available TCI list includes, but is not limited to, various RAM, and other types of memory known in the arts. Suitable hardware for implementing the status manager and the NCQ tag processor includes, but is not limited to, state machines.

To further illustrate certain concepts, an exemplary method of operation will now be described. As shown at numeral (1), the initiator device may send a command to the controller. By way of example, the command may include a read, write, or other data transfer command. In one or more embodiments of the invention, such as, for example, in a SATA embodiment, the command may include an initiator-to-target register Frame Information Structure (FIS), which is a First Party DMA command.

The command may include an NCQ tag that uniquely identifies the command. For example, in one or more embodiments of the invention, the initiator-to-target register FIS may include bits 7 to 3 of a DWORD 3 or sector count field as the NCQ tag. These 5 bits of the NCQ tag are sufficient to uniquely identify up to 32 different outstanding commands.

As an option, the target may potentially have the capability to notify the initiator device of a supporting limited number of queued commands, which may be less than 32 queued commands. In such an aspect, the value of the NCQ tag may be constrained such that it does not exceed the supported number of queued commands. However, this is not required.

The controller of the target may receive the command through the link. The received command may pass logically through the link and phy layers.

As shown at numeral (2), the link and phy layers may be coupled with, or otherwise in communication with, the NCQ tag processor, and may provide the command to the NCQ tag processor. In one or more embodiments of the invention, the command may include an RX FIS for a write command, for example. The NCQ tag processor may include circuitry, hardware, or other logic to parse the command to determine the NCQ tag. In one or more embodiments of the invention, the NCQ tag processor may be implemented as a state machine, although the scope of the invention is not limited in this respect.

The NCQ tag processor is coupled with, or otherwise in communication with, the enqueued command register. As shown at numeral (3), the NCQ tag processor may include logic to index or otherwise access information in a storage location of the enqueued command register that is indicated by the NCQ tag. The enqueued command register may be logically divided into a plurality of storage locations. For example, as shown in the illustrated embodiment, the enqueued command register may include 32 bits, although the invention is not so limited. Each of the storage locations may correspond to a different command and tag. For example, the binary format NCQ tag 11111 may correspond to and index the 32nd bit. Each of the storage locations may store information associated with the corresponding command, such as, for example, information to indicate whether or not a command with a tag indicating the corresponding storage location is outstanding and enqueued.

Next, as shown at numeral (4), the NCQ tag processor may receive or otherwise determine a value of a bit that is indexed by the NCQ tag. The bit may have either a value of 0, in which the bit is sometimes also referred to as being cleared or not set, or a value of 1, in which the bit is sometimes also referred to as being set.

According to one or more embodiments of the invention, if the bit has a first value, such as, for example, 0, then it may be determined, inferred, or assumed that no outstanding enqueued command has the same NCQ tag. That is, if the information in the storage location indicated by the NCQ tag indicates that a command with a tag indicating the corresponding storage location is not enqueued. In response, the hardware oriented SATA NCQ tag management unit may perform the set of operations shown by numerals (5) to (10).

In particular, as shown at numeral (5), the NCQ tag processor may include logic in communication to request, fetch, retrieve, or otherwise access a task context index (TCI) from the available TCI list. The NCQ tag processor may be coupled with, or otherwise in communication with, the available TCI list for this purpose.

As shown at numeral (6), the NCQ tag processor and available TCI list may cooperate to provide the fetched or otherwise retrieved TCI to an NCQ tag indicated or indexed entry in the TCI mapping table. The available TCI list may be coupled with, or otherwise in communication with, the TCI mapping table for this purpose. In one or more embodiments of the invention, the TCI mapping table may be implemented in hardware, such as, for example, registers or RAM. The available TCI list may optionally communicate to the NCQ tag processor that the TCI has been sent. After providing the TCI to the TCI mapping table, the corresponding bit in the enqueued command register may be set.

As shown at numeral (7), the command provided to the NCQ tag processor may be sent or otherwise provided to the receive processor. The NCQ tag processor may be coupled with, or otherwise in communication with, the receive processor for this purpose.

As shown at numeral (8), the fetched or otherwise retrieved TCI may be sent or otherwise provided along with the command. The available TCI list may be coupled with, or otherwise in communication with, the receive processor for this purpose. As shown, the command may optionally pass through the NCQ tag processor, although this is not required as long as the NCQ tag is provided to, or otherwise available to, the NCQ tag processor.

As shown at numeral (9), the NCQ tag processor may be coupled with, or otherwise in communication with, the status manager, and may provide status information to the status manager. According to one or more embodiments of the invention, the status manager may be implemented in hardware, such as, for example, by one or more state machines, although this is not required.

Then, as shown at numeral (10), the status manager may generate and provide a controller-to-initiator status signal to the initiator device via coupling or communication through the intervening link and phy layers. In one or more embodiments of the invention, the status signal may include a status register FIS with setting bit 7 to be zero in status field, although the scope of the invention is not limited in this respect.

The initiator device may receive the register FIS or other status signal, and may potentially clear the so-called busy bit in a command shadow register, for example. However, throughout this description it should be noted that the scope of the invention is not limited by the initiator device or by any known processing that may or may not occur in the initiator device.

Referring again to the determination as shown at numeral (4), according to one or more embodiments of the invention, upon receiving a command FIS, if the NCQ tag indexed bit determined as shown at numeral (4) has a second value, such as, for example, 1, then it may be determined, inferred, or assumed that a previous outstanding enqueued command has the same NCQ tag. In such a case, it may be determined, inferred, or assumed, that an error has occurred.

As shown at numeral (11), the NCQ tag processor may provide status information indicating the potential error to the status manager. Then, as shown at numeral (12), the status manager may generate and provide a controller-to-initiator status signal, such as, for example, a status register FIS indicating the potential error. The initiator and controller devices may then perform a substantially conventional error handling routine.

It should be noted that one of two possible conventions has been described above in order to illustrate certain concepts, although the scope of the invention is not limited to this particular convention. For example, in one or more alternate embodiments of the invention, a bit may be cleared in the enqueued command register to indicate that a command is outstanding and the bit may be set when the command is no longer outstanding.

Now, the target may accept multiple commands from the initiator device by procedures analogous to those for the above-described command. According to NCQ, the target is not required to execute the commands in the order in which they are issued by the initiator device, but rather may re-order the execution of the outstanding commands. In some cases, the target may include software or firmware to re-order the execution of the commands and determine a next command to execute. In some aspects, the software or firmware may potentially attempt to optimize the order in which commands are executed in order to reduce latency, maximize bandwidth, or attempt to optimize other objectives. In some cases, the software or firmware may re-order the commands based on information local to the target, such as, for example, disk rotational position, and/or other target-side information. For clarity, the scope of the invention is not limited by how the target re-orders the commands, or what criteria the target uses to re-order the commands. It is sufficient that the target selects or otherwise determines a next command to execute, regardless of the procedure or criteria used to determine the command.

Refer again to FIG. 2. As shown, the transmit processor may be coupled with, or otherwise in communication with, the TCI mapping table.

As shown at numeral (13), after the target has determined a next command to execute, the transmit processor may use the TCI corresponding to the command, such as, for example, the TCI provided to the protocol engine at numeral (8), in order to look up the corresponding NCQ tag in the TCI mapping table, which may potentially be hardware implemented. By way of example, the TCI may be compared to the TCI at each NCQ tag indexed entry of the TCI mapping table until a match or correspondence is detected, and the NCQ tag corresponding to the matching or corresponding TCI may be determined. As shown at numeral (14), the determined NCQ tag corresponding to the TCI may be provided from the TCI mapping table to the transmit processor.

As shown at numeral (15), the transmit processor may use the NCQ tag to generate and transmit or otherwise provide a command selection signal that may include the NCQ tag to the initiator device, via the intervening link and phy layers. The signal may communicate a selection of a command for execution. As shown, in one or more embodiments of the invention, the command selection signal may include a DMA Setup FIS for a write command, and the DMA Setup FIS may include the NCQ tag. By way of example, the NCQ tag may potentially be included in the lower 5 bits of DWORD 1 of the DMA Setup FIS. The DMA Setup FIS may potentially include other information, such as, for example, proper DMA transfer count and/or DMA buffer offset, although the scope of the invention is not limited in these respects.

As shown at numeral (16), after transmitting the command selection signal, such as, for example, the DMA Setup FIS for the write command, the transmit processor may provide the TCI to the receive processor. The receive processor may receive the TCI. As will be explained further below, the receive processor may know to preserve and use the TCI to subsequently process a command completion signal, such as, for example, a data FIS corresponding to the transmitted DMA Setup FIS. Often, the data FIS may not include an NCQ tag.

The initiator device may receive the command selection signal, such as, for example, the DMA Setup FIS. The initiator device may use the NCQ tag field to determine which of the previously issued commands to process. Since the command provided as shown at numeral (1) and the command selection signal provided as shown at numeral (15) may have the same NCQ tags, the initiator device may know which of the previously issued outstanding commands has been selected for execution.

While processing the command, the initiator device may temporarily stop issuing new commands to the same target until data transfer operations associated with the signal have been completed. However, the initiator device may potentially continue to issue certain commands, such as, for example, device reset, read log ext command for error processing, and/or other such service commands. However, the scope of the invention is not limited in these respects.

As shown at numeral (17), the initiator device may generate and provide a command completion signal, such as, for example, a data FIS corresponding to the previously described DMA Setup FIS, to the target via the intervening link. In generating the command completion signal, the initiator device may potentially use information in the received signal, such as, for example, the previously described DMA transfer count and DMA buffer offset, as well as other information known to the initiator device. However, the scope of the invention is not limited to any known initiator device or to any known processing within the initiator device.

As shown at numeral (18), the link and phy layers may provide the command completion signal, such as, for example, the data FIS corresponding to the previously described DMA Setup FIS, to the receive processor. It is not required that NCQ tag to TCI mapping be performed, in the way it is performed for a new command, since the transmit processor previously provided TCI to the receive processor, as shown at numeral (16). Upon receiving the TCI, the receive processor may know to wait for the command completion signal, and may know that the command completion signal, once received, may be processed using the TCI.

As shown at numeral (19), when the command is completed, the transport processor may use the TCI corresponding to the completed command to look up the corresponding NCQ tag in the TCI mapping table. This may optionally be performed in the same way as described above at numeral (13).

Then, as shown at numeral (20), the determined NCQ tag may be used to index into the status register to change the status information in a storage location of the status register with an I/O done signal from the transmit processor. As shown, the status register may be logically divided into multiple storage locations. For example, as shown in the illustrated embodiment, the status register may include 32 bits, although the scope of the invention is not so limited. Each of the storage locations may correspond to a different command and corresponding tag. For example, the binary format NCQ tag value 11111 may correspond to and index the 32nd bit of the status register.

Each of the storage locations may store status information associated with the corresponding command. The status information may indicate whether or not the corresponding command has been completed. For example, each bit of the status register may have a value that indicates whether or not a previously issued outstanding command has been completed.

Since a bit may have a value of either 0 or 1, there are at least two different possible conventions that may be employed. According to one possible convention, a bit that is indexed by a particular NCQ tag may have a value of 0 to indicate that the previously issued outstanding command corresponding to the NCQ tag has not yet been completed, or a value of 1 to indicate that the previously issued command corresponding to the NCQ tag has been completed.

According to embodiments of the invention that follow this convention, the value of the bit of the status register that is indexed by the NCQ tag may be changed from initially 0 to 1. That is, the bit may be set. However, the scope of the invention is not limited to just this convention.

As shown at numeral (21), at an appropriate time, such as, for example, when the transmit processor is idle or otherwise available, the status manager may access the status register and provide a command completion status signal to the initiator device via the intervening link and phy layers, and the link. In one or more embodiments of the invention, the command completion status signal may include a Set Device Bits (SDB) FIS. According to the above-described possible convention, the bits of the SDB FIS that correspond to commands that have been executed may be set, although the scope of the invention is not so limited. As one example, bits corresponding to completed commands may be set in the DWORD 1 register (SActive Field) corresponding to the bit position for each completed NCQ tag to indicate completed status. For instance, if the command corresponding to the second NCQ tag has been completed by the device without errors, then the second bit of SActive field may be set and the corresponding error fields may be cleared.

As shown at numeral (22), in response to receiving the command completion status signal, the initiator device may provide an acknowledgement signal to the status manager. Then, as shown at numeral (23), the status manager may include logic in communication to clear or otherwise change or modify information in a logical storage location of the enqueued command register, such as for example, by clearing a bit indexed by a tag after a command corresponding to or identified by the tag has been completed.

Accordingly, the controller and initiator devices may employ a status return mechanism to communicate that execution of a command has been completed. The status return mechanism may be race-free, and may be without initiator handshakes upon command completion. The controller may issue command completions for multiple commands back-to-back, or even at the same time. The controller may potentially aggregate completions if multiple commands are completed closely in time. For example, a controller may potentially return successful command completion status for 32 commands simultaneously in a single 64-bit packet command completion status signal.

Particular embodiments have been described, but many alternate embodiments are also contemplated. For example, according to one or more alternate embodiments of the invention, rather than using TCI, another internal format may optionally be used. Suitable alternate formats potentially include MMR offset, translated buffer number, and port number of downstream ports, to name just a few examples. Further, according to one or more alternate embodiments of the invention, the NCQ tag may suffice without mapping to TCI or an alternate format, such as, for example, in implementations in which no more than 32 outstanding commands are supported. In such a case, it is not required that TCI be fetched from an available TCI list using an NCQ tag.

Figure 3:
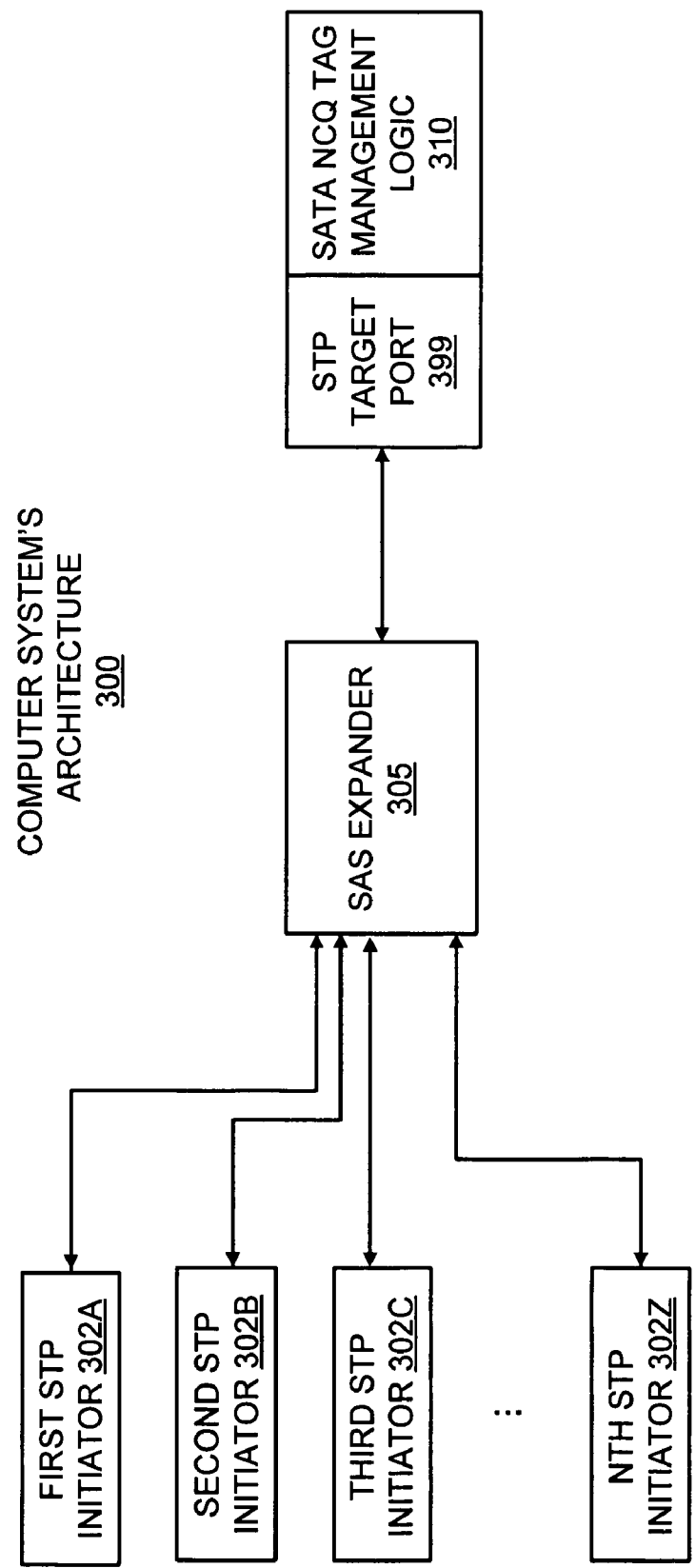
FIG. 3 is a block diagram showing a computer system's architecture including a plurality of STP initiators, a SAS expander, and a STP target port that may concurrently interact with multiple of the STP initiators, according to one or more embodiments of the invention.

FIG. 3 is a block diagram showing a computer system's architecture 300, according to one or more embodiments of the invention. The architecture includes a plurality of STP initiators 302A-302Z, an SAS expander 305, and an STP target port 399.

The plurality of STP initiators include a first STP initiator 302A, a second STP initiator 302B, a third STP initiator 302C, and an Nth STP initiator 302Z. The scope of the invention is not limited to any known number of STP initiators.

Each of the STP initiators is coupled with, or otherwise in communication with, the SAS expander by a different link. The SAS expander is coupled with, or otherwise in communication with, the STP target port by a link.

The STP target port may concurrently support multiple of the STP initiators. By way of example, this may occur in certain high-end server storage networks.

A SATA NCQ tag management logic 310 is coupled with, or otherwise in communication with, the STP target port. In one or more embodiments of the invention, the SATA NCQ tag management logic may receive signals from the STP target port. The SATA NCQ tag management logic may optionally be included in an STP device, although the scope of the invention is not limited in this respect.

Figure 4:
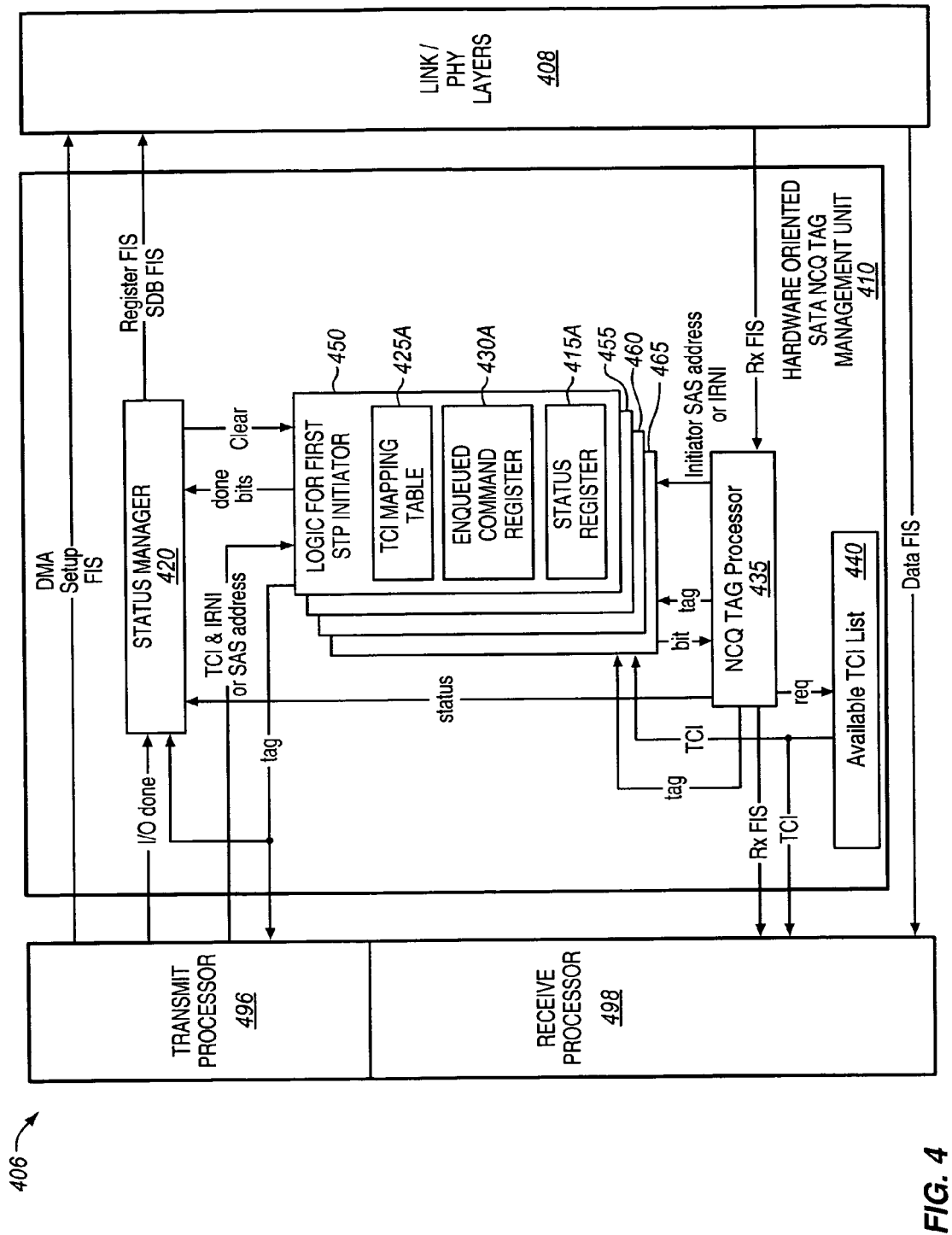
FIG. 4 is a block diagram showing a hardware oriented SATA NCQ tag management unit of a controller that includes multiple sets of logic to allow a STP target port to concurrently interact with multiple STP initiators, according to one or more embodiments of the invention.

FIG. 4 shows a controller 406 including a SATA NCQ tag management unit 410 that is capable of allowing a STP target port to concurrently support multiple STP initiators, according to one or more embodiments of the invention.

The controller, the SATA NCQ tag management unit, and certain of the components thereof, may optionally have certain similar operations and characteristics as the correspondingly named components described elsewhere herein. To avoid obscuring the description, the discussion below will focus primarily on the different and/or additional operations and characteristics.

The illustrated controller includes link and phy layers 408, the aforementioned hardware oriented SATA NCQ tag management unit 410, transport layer transmit processor 496 and a transport layer receive processor 498. As shown, the hardware oriented SATA NCQ tag management unit may include a status manager 420, an NCQ tag processor 435, and an available TCI list 440.

As shown, the SATA NCQ tag management unit may also include a plurality of different sets of logic 450, 455, 460, 465, which may each correspond to and/or be used for a different STP initiator. That is, the sets may be provided one per initiator. In the illustrated embodiment the plurality of sets include a first set 450, a second set 455, a third set 460, and a fourth set 465, although the scope of the invention is not limited to any known number of such sets. By way of example, the first set may correspond to a first STP initiator, the second set may correspond to a second STP initiator, the third set may correspond to a third STP initiator, and the fourth set may correspond to a fourth STP initiator. In any event, the different sets may correspond to different initiators.

As shown, according to one or more embodiments of the invention, each of the sets of logic may include a TCI mapping table, an enqueued command register, and a status register. As shown, the first set may include a first TCI mapping table 425A, a first enqueued command register 430A, and a first status register 415A. By way of example, these components of the first set may perform respective operations similar to those described elsewhere herein for the first STP initiator 302A.

Now, the status manager, NCQ tag processor, and available TCI list, may interact with the TCI mapping table, enqueued command register, and status register, in a generally analogous manner as described elsewhere herein, with the exception that, as shown, they may access these components through a respective set of logic for a particular initiator. Additionally, the particular connections and avenues of communication shown in the illustrated embodiment are only one of many possible ways in which communication may be achieved between the components. The scope of the invention is not limited to just this particular configuration.

In one or more embodiments of the invention, a set of logic corresponding to a STP initiator may be accessed, identified, or selected, with information that is unique to the STP initiator, such as, for example, a SAS address of the STP initiator, or a STP initiators remote node index (IRNI). The IRNI may potentially be the same as the initiator SAS address or a hashed value of the initiator SAS address.

As one example, as shown in the illustrated embodiment, the transmit processor may use TCI and either a SAS address or an IRNI to look up a NCQ tag. The SAS address or IRNI may be used to select an appropriate set of logic, and the TCI may be used to determine the NCQ tag from a TCI mapping table of the selected appropriate set of logic. As another example, as shown, the NCQ tag processor may access, identify, or select a set of logic with either the SAS address or IRNI of an STP initiator.

When a new STP initiator begins to establish a connection with the STP target port or STP target device through the controller, a new set of logic may be created or otherwise provided based on a SAS address or other information unique to the new initiator. This may include loading a TCI mapping table. In one or more embodiments of the invention, the loading of the mapping table may be implemented in hardware, rather than in software or firmware, in order to achieve hardware acceleration and increased loading speed, although this is not required. This may offer a potential advantage of achieving faster initiator connection acceptance, although the scope of the invention is not limited in this respect.

In one or more embodiments of the invention, a connection or communication with a STP initiator may be closed or terminated when there are no additional outstanding commands associated with the STP initiator in a respective corresponding set of logic. For example, connection or communication with an STP initiator may be closed or terminated when a TCI mapping table includes no outstanding commands. This may offer a potential advantage of improved connection management. For example, closing a connection to an STP initiator that has no outstanding commands may potentially reduce connection management overhead and/or may allow other STP initiators to establish connections or communications with the target. However, the scope of the invention is not limited in respect to achieving these advantages.

Now, in one or more embodiments of the invention, at least some of the logic and operations of the above-described various SATA NCQ tag management units may be implemented in circuitry or other hardware, such as, for example, registers and/or state machines. In various embodiments of the invention, hardware may be used to perform FIS processing functions, such as, for example, generating a status register FIS and/or generating a Set Device Bits FIS. Use of hardware may offer certain potential advantages over firmware. For example, hardware oriented SATA NCQ tag management unit may help to insulate or isolate the SATA NCQ tag management from upper layers, such as, for example, the application layer. The application layer may not need to process NCQ tags of FISes, such as, for example, the DMA Setup FIS or the status register FIS. This may tend to help to reduce the load on the target-side processor responsible for executing the application layer software or otherwise improve performance. However, the scope of the invention is not limited to implementing the NCQ tag management unit in hardware and one or more of the above-described options may also optionally be implemented in software or firmware.

Figure 5:
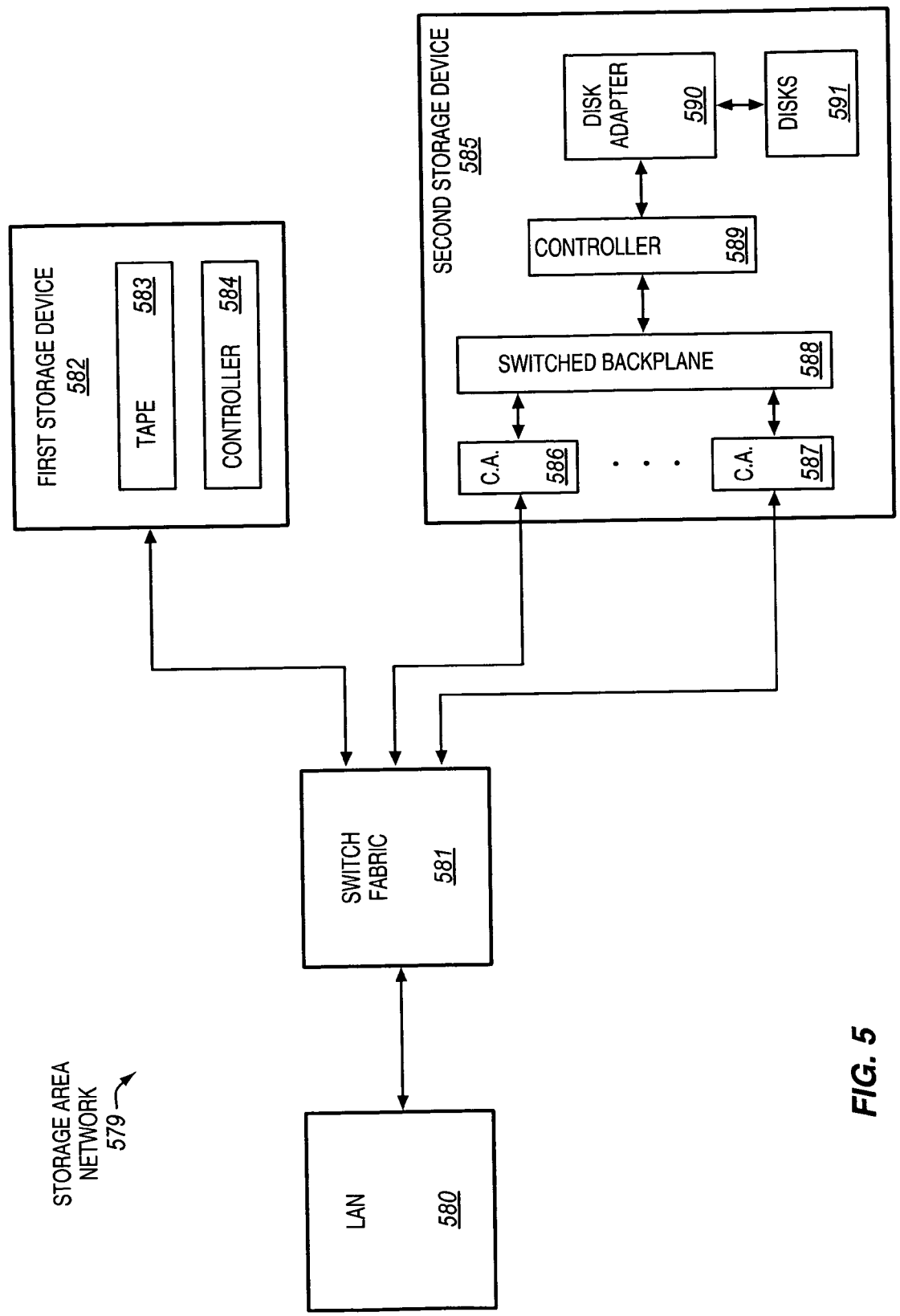
FIG. 5 is a block diagram showing a storage area network suitable for implementing one or more embodiments of the invention.

FIG. 5 is a block diagram showing a storage area network 579 suitable for implementing one or more embodiments of the invention. The network includes a local area network (LAN) 580, a switch fabric 581, a first storage device 582, and a second storage device 585.

By way of example, and not limitation, the LAN may include a plurality of potentially heterogeneous servers or other computer systems connected together to form a network. The LAN is coupled with, or otherwise in communication with, the first and second storage devices, by the switch fabric. By way of example, and not limitation, the switch fabric may potentially include fibre channel switches.

The first storage device is coupled with the switch fabric and includes a tape 583 and a controller 584. The controller may optionally include SATA NCQ tag management logic as disclosed elsewhere herein.

The second storage device includes a plurality of channel adapters 586, 587 coupled with the switch fabric, a switched backplane 588 coupled with each of the channel adapters, a controller 589 coupled with the switched backplane, a disk adapter 590 coupled with the controller, and a plurality of disks 591 coupled with the disk adapter. The controller may optionally include SATA NCQ tag management logic as disclosed elsewhere herein. Suitable disks include, but are not limited to, hard disks and optical disks.

The tapes and disks represent exemplary different types of storage mediums that may be used in storage devices to store data. Tapes are commonly used in some devices, such as, for example, tape backups, while disks are commonly used in other devices, such as, for example, storage disk arrays. In any event, disks are used in some, but not all, storage devices, and tapes are likewise used in some, but not all, storage devices.

In the description and claims, the terms "coupled" and "connected," along with their derivatives, may be used. It should be understood that these terms are not intended as synonyms for each other. Rather, in particular embodiments, "connected" may be used to indicate that two or more components are in direct physical or electrical contact with each other. Attached may be used analogously to connected. "Coupled" may mean that two or more components are in direct physical or electrical contact. However, "coupled" may also mean that two or more components are not in direct contact with each other, but yet still co-operate or interact with each other. For example, two or more components may be coupled with one another via one or more intervening components. In addition, two or more components may be in communication with one another if they exchange data or information, regardless of whether they are in direct contact or not.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

Various operations and methods have been described. Some of the methods have been described in a basic form, but operations may optionally be added to and/or removed from the methods. The operations of the methods may also often optionally be performed in different order. Many modifications and adaptations may be made to the methods and are contemplated.

Certain operations may be performed by hardware components, or may be embodied in machine-executable instructions, that may be used to cause, or at least result in, a circuit programmed with the instructions performing the operations. The circuit may include a general-purpose or special-purpose processor, or logic circuit, to name just a few examples. The operations may also optionally be performed by a combination of hardware and software.

One or more embodiments of the invention may be provided as a program product or other article of manufacture that may include a machine-accessible and/or readable medium having stored thereon one or more instructions and/or data structures. The medium may provide instructions, which, if executed by a machine, may result in and/or cause the machine to perform one or more of the operations or methods disclosed herein. Suitable machines include, but are not limited to, storage devices, SATA target devices, STP target devices, computer systems, storage controllers, processors, network devices, and a wide variety of other devices with one or more processors, to name just a few examples.

The medium may include, a mechanism that provides, for example stores and/or transmits, information in a form that is accessible by the machine. For example, the medium may optionally include recordable and/or non-recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

A medium may also optionally include an electrical, optical, acoustical, radiofrequency, or other form of propagated signal, such as carrier waves, infrared signals, digital signals, for example. One or more embodiments of the invention may be downloaded as a computer program product, wherein the program may be transferred from one machine to another machine by way of data signals embodied in a carrier wave or other propagation signal or medium via a communication link (e.g., a modem or network connection).

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

It should also be appreciated that reference throughout this specification to "one embodiment", "an embodiment", or "one or more embodiments", for example, means that a particular feature may be included in the practice of the invention. Such recitations do not necessarily refer to the same embodiment. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

Accordingly, while the invention has been thoroughly described in terms of several embodiments, those skilled in the art will recognize that the invention is not limited to the particular embodiments described, but may be practiced with modification and alteration within the spirit and scope of the appended claims. The description is thus to be regarded as illustrative instead of limiting.

What is claimed is:

1. An apparatus comprising:
   a Serial Attached SCSI (SAS) expander;
   a Serial Tunneling Protocol (STP) port in communication with the SAS expander;
   a first set of logic in communication with the STP port and to correspond to a first STP initiator, the first set of logic including a first status memory corresponding to the first STP initiator, the first status memory to store status information for each of a first plurality of commands that have been queued according to Native Command Queuing (NCQ), wherein the status information is to indicate whether or not each of the commands has been completed, the first set of logic also including a first enqueued command memory corresponding to the first STP initiator and a first task context index (TCI) mapping table corresponding to the first STP initiator;
   a second set of logic in communication with the STP port and to correspond to a second STP initiator that is different than the first STP initiator, the second set of logic including a second status memory corresponding to the second STP initiator that is different than the first STP initiator, the second set of logic also including a second enqueued command memory corresponding to the second STP initiator and a second TCI mapping table corresponding to the second STP initiator;
   a third set of logic in communication with the STP port and to correspond to a third STP initiator that is different than the first and second STP initiators, the third set of logic including a third status memory, the third set of logic also including a third enqueued command memory corresponding to the third STP initiator and a third TCI mapping table corresponding to the third STP initiator; and
   status manager circuit in communication with the STP port and the first, second, and third status memories, the Status manager circuit to generate and provide status signals based on the status information stored in the first, second, and third status memories.

2. The apparatus of claim 1, wherein the first status memory comprises a register that is logically divided into a plurality of storage locations, each of the storage locations corresponds to a respective one of the first plurality of commands, each of the storage locations to store status information for the respective one of the first plurality of commands.

3. The apparatus of claim 2, wherein the register has 32 storage locations, each of the storage locations including a single bit.

4. The apparatus of claim 1, wherein the first status memory comprises one or more selected from a flip-flop and a static random access memory (SRAM).

5. The apparatus of claim 1, wherein the status manager circuit comprises one or more state machines.

6. The apparatus of claim 1, further comprising:
   wherein the first enqueued command memory corresponding to the first STP initiator is to store information indicating whether or not commands received from the first STP initiator and having tags have been queued and are outstanding;
   wherein the second enqueued command memory corresponding to the second STP initiator is to store information indicating whether or not commands received from the second STP initiator and having tags have been queued and are outstanding; and
   circuitry of the status manager circuit in communication with the first and second enqueued command memories, said circuitry to change information in the first and second enqueued command memories after commands have been completed.

7. The apparatus of claim 1, further comprising:
   a transport layer logic in communication with the first status memory, the transport layer logic to change status information for a command after the command has been completed.

8. An apparatus comprising: a first enqueued command memory corresponding to a first Serial Tunneling Protocol (STP) initiator, the first enqueued command memory to store information indicating whether or not commands received from the first STP initiator and having tags have been queued' according to Native Command Queuing (NCQ) and have not been completed; a second enqueued command memory corresponding to a second STP initiator that is different than the first STP initiator, the second enqueued command memory to store information indicating whether or not commands received from the second STP initiator and having tags have been queued according to NCQ and have not been completed; a third enqueued command memory corresponding to a third STP initiator that is different than the first and second STP initiators, the third enqueued command memory to store information indicating whether or not commands received from the third STP initiator and having tags have been queued according to NCQ and have not been completed; a tag processor circuit in communication with the first, second, and third enqueued command memories, the tag processor circuit to determine NCQ tags of commands and to access information in the first, second, and third enqueued command memories with the determined NCQ tags; an available task context index (TCI) list; and circuitry of the tag processor circuit in communication with the available TCI list, the circuitry to obtain a TCI from the available TCI list based on information in the first enqueued command memory associated with a command with a NCQ tag; a first TCI mapping table in communication with the available TCI list and the tag processor circuit, the first TCI mapping table to store the TCI at a storage location indicated by the NCQ tag; and a second TCI mapping table corresponding to the second STP initiator.

9. The apparatus of claim 8, wherein the first enqueued command memory comprises a register that is logically divided into 32 storage locations.

10. The apparatus of claim 8, wherein the tag processor circuit comprises a state machine.

11. A method comprising: using information unique to a Serial Tunneling Protocol (STP) initiator to select a hardware implemented mapping table from at least three hardware implemented mapping tables, each of the hardware implemented mapping tables corresponding to a different STP initiator; using task context index (TCI) to look up a Native Command Queuing (NCQ) tag in the selected hardware implemented mapping table; generating a Direct Memory Access (DMA) Setup Frame Information Structure (FIS) that includes the NCQ tag; and providing the DMA Setup FIS to a port; wherein said using the information unique to the STP initiator comprises using one of a Serial Attached SCSI (SAS) address of the STP initiator, a hashed value of the SAS address of the STP initiator, and a remote node index (RNI) of the STP initiator to select the hardware implemented mapping table.

12. The method of claim 11, further comprising closing a connection to the STP initiator corresponding to the hardware implemented mapping table when the hardware implemented mapping table includes no outstanding commands.

13. The apparatus of claim 1, further comprising logic to select the first status memory with information unique to the first STP initiator.

14. The apparatus of claim 1, wherein the second status memory is to store status information for each of a second plurality of commands that have been queued according to NCQ, wherein the status information stored by the second status memory is to indicate whether or not each of the second plurality of commands has been completed.

15. The apparatus of claim 8, further comprising logic to select the first enqueued command memory with information unique to the first STP initiator.

16. The apparatus of claim 8, further comprising an STP port coupled with the tag processor circuit.

17. The method of claim 11, wherein providing the DMA Setup FIS to the port comprises providing the DMA Setup FIS to an STP port.

18. An apparatus comprising: a Serial Tunneling Protocol (STP) port; a first set of logic in communication with the STP port and to correspond to a first STP initiator, the first set of logic including a first status memory corresponding to the first STP initiator, the first status memory to store status information for each of a first plurality of commands that have been queued according to Native Command Queuing (NCQ), wherein the status information is to indicate whether or not each of the commands has been completed; a second set of logic in communication with the STP port and to correspond to a second STP initiator that is different than the first STP initiator, the second set of logic including a second status memory corresponding to the second STP initiator that is different than the first STP initiator; a third set of logic in communication with the STP port and to correspond to a third STP initiator that is different than the first and second STP initiators, the third set of logic including a third status memory; and status manager circuit in communication with the STP port and the first and second status memories, the status manager circuit to generate and provide status signals based on the status information stored in the first and second status memories; wherein the first set of logic comprises a first enqueued command memory and a first task context index (TCI) mapping table, wherein the second set of logic comprises a second enqueued command memory and a second TCI mapping table, wherein the third set of logic comprises a third enqueued command memory and a third TCI mapping table.

19. The apparatus of claim 18, further comprising logic to select the first status memory with information unique to the first STP initiator.

* * * * *